US009669554B2

(12) United States Patent
Eisele

(10) Patent No.: US 9,669,554 B2
(45) Date of Patent: Jun. 6, 2017

(54) VALVE FOR A VACUUM HANDLING OR VACUUM CLAMPING DEVICE, AND VACUUM HANDLING MEANS

(71) Applicant: J. Schmalz GmbH, Glatten (DE)

(72) Inventor: Thomas Eisele, Alpirsbach-Peterzell (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/900,570

(22) PCT Filed: Sep. 16, 2014

(86) PCT No.: PCT/EP2014/069733
§ 371 (c)(1),
(2) Date: Dec. 21, 2015

(87) PCT Pub. No.: WO2015/062778
PCT Pub. Date: May 7, 2015

(65) Prior Publication Data
US 2016/0236355 A1    Aug. 18, 2016

(30) Foreign Application Priority Data
Nov. 4, 2013 (DE) .................. 10 2013 222 378

(51) Int. Cl.
*B25J 15/06* (2006.01)
*B25B 11/00* (2006.01)
(Continued)

(52) U.S. Cl.
CPC ......... *B25J 15/0625* (2013.01); *B25B 11/005* (2013.01); *B25B 11/007* (2013.01);
(Continued)

(58) Field of Classification Search
CPC  B25J 15/0616; B25J 15/0625; B25J 15/0633; F16K 1/14; F16K 31/12;
(Continued)

(56) References Cited

U.S. PATENT DOCUMENTS 3,558,171 A * 1/1971 Netsch et al. ........ B66C 1/0212
                                                            294/186
4,078,671 A * 3/1978 Lundstrom .......... B25J 15/0616
                                                            294/183
(Continued)

FOREIGN PATENT DOCUMENTS

CN          1955519 A      5/2007
DE          396668 C        6/1924
(Continued)

OTHER PUBLICATIONS

Examination Report issued by the German Patent Office in German Patent Application No. 10 2013 222 378.1 dated Jul. 3, 2014.
(Continued)

*Primary Examiner* — Stephen Vu
(74) *Attorney, Agent, or Firm* — Howard & Howard Attorneys PLLC

(57) ABSTRACT

Valve with a valve housing which has a vacuum supply side and a suction side, with a flexible dividing wall which delimits a control space in the valve housing. A valve body which is arranged on the flexible dividing wall and can be moved between an open position and a closed position, wherein the valve body has a sealing portion which, in the closed position, bears against a sealing seat in order to seal the vacuum supply side with respect to the suction side. The volume of the control space is reduced with deformation of the flexible dividing wall and the valve body is moved from the open position into the closed position. The valve body has a suction side passage, and the sealing portion and the sealing seat are arranged in such a way that, in the closed (Continued)

position, the flow connection through the suction side passage is sealingly closed.

10 Claims, 1 Drawing Sheet

(51) Int. Cl.
*B65G 47/91* (2006.01)
*F16K 1/12* (2006.01)
*F16K 51/02* (2006.01)

(52) U.S. Cl.
CPC .............. *B65G 47/91* (2013.01); *F16K 1/126* (2013.01); *F16K 51/02* (2013.01)

(58) Field of Classification Search
CPC ........ F16K 1/126; F16K 51/02; Y10S 901/40; B25B 11/005; B25B 11/007; B65G 47/91
See application file for complete search history.

(56) References Cited

U.S. PATENT DOCUMENTS

| | | | | |
|---|---|---|---|---|
| 4,787,812 A | * | 11/1988 | Gopfert | B66C 1/0212 294/188 |
| 6,302,387 B1 | | 10/2001 | Schmalz et al. | |
| 7,017,961 B1 | * | 3/2006 | Parnell | B65G 47/91 294/188 |
| 7,648,182 B2 | * | 1/2010 | Salimkhan | B25J 15/04 294/188 |
| 2003/0188790 A1 | | 10/2003 | Schmalz et al. | |
| 2013/0082474 A1 | * | 4/2013 | Lomerson, Jr. | B25J 15/0633 294/186 |

FOREIGN PATENT DOCUMENTS

| | | |
|---|---|---|
| DE | 3429444 A1 | 2/1986 |
| DE | 19814262 A1 | 10/1999 |
| DE | 10216220 A1 | 11/2003 |

OTHER PUBLICATIONS

International Search Report issued in PCT International Application No. PCT/EP2014/069733 mailed Jan. 20, 2015.
Witten Opinion of the International Searching Authority issued in PCT International Application No. PCT/EP2014/069733 mailed Jan. 20, 2015.
International Preliminary Report on Patentability issued in PCT International Application No. PCT/EP2014/069733 dated May 10, 2016.
Notification of the First Office Action issued by the State Intellectual Property Office of the People's Republic of China in Chinese Patent Application No. 201480004286.9 dated May 5, 2016.

\* cited by examiner

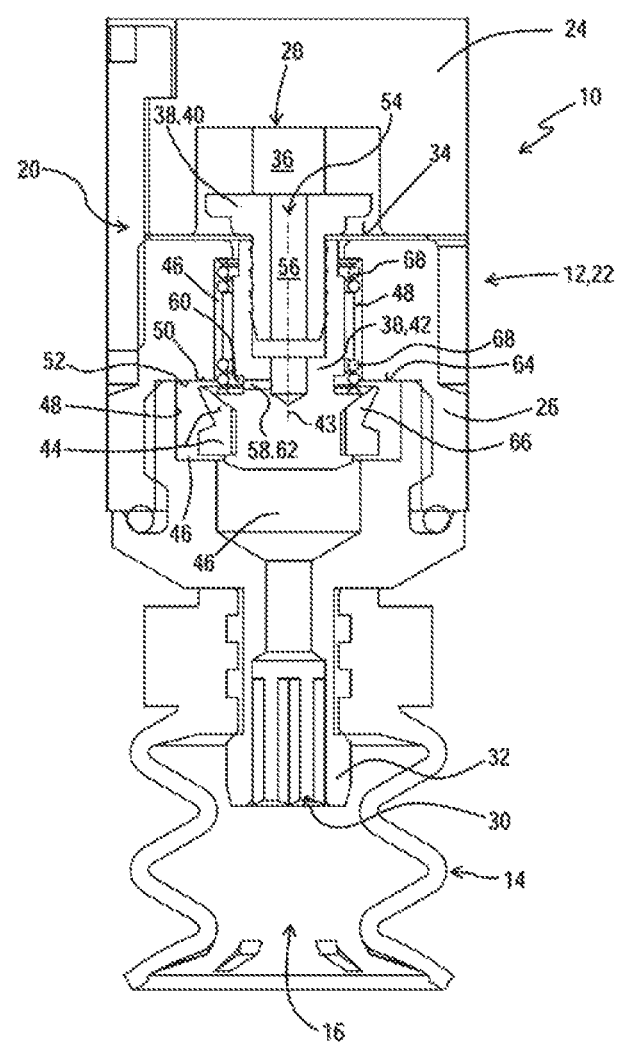

VALVE FOR A VACUUM HANDLING OR VACUUM CLAMPING DEVICE, AND VACUUM HANDLING MEANS

CROSS-REFERENCE TO RELATED APPLICATIONS

The present application is a National Stage of International Patent Application No. PCT/EP2014/069733, filed on Sep. 16, 2014, which claims priority to and all the benefits of German Patent Application No. 10 2013 222 378.1, filed on Nov. 4, 2013, both of which are hereby expressly incorporated herein by reference in their entirety.

BACKGROUND OF THE INVENTION

1. Field of the Invention

The invention relates to a valve for vacuum handling devices or vacuum clamping devices. These are valves that close automatically when a suction point is unoccupied, and thus prevent an undesired leakage from the suction side to the vacuum supply side.

2. Description of the Related Art

Various solutions are known for preventing an undesired leakage when the suction point is unoccupied. By way of example, DE 34 29 444 A1 shows a flow control valve in which a valve body having a spherical design is disposed in a flow channel such that it can be displaced. If the unoccupied suction point draws freely, the sphere is pulled against a seal seat in the flow channel, due to the flow impulse, and closes the flow channel. Because the triggering occurs by means of the flow impulse, valves of this type are prone to malfunction when subjected to flow impacts. Also when the suction point is active, the closed position may be assumed at the start of a suction process, in an undesired manner, due to the initial flow impact.

On the other hand, valves are known with which an automatic closing does not occur due to a flow impulse when the valve draws freely when the suction side is unoccupied, but rather, is initiated by a static pressure difference that is established when the valve draws freely.

DE 198 14 262 C2 shows a valve having a control chamber, delimited by a flexible section of the valve body, that is in constant connection to the vacuum supply side. When the control chamber is compressed, the flexible section is deformed, such that the valve body is brought into its closed position. The control chamber is fully closed off, in terms of flow, with respect to the suction side. When suction occurs while the suction side is unoccupied, no vacuum is created at the suction side. As a result, the control chamber is compressed due to the static pressure difference between the control chamber and suction side, and the valve body is brought into its closed position. With respect to the valves that function by means of flow impulses, this has the advantage that disruptions caused by flow impacts can be avoided. This requires, however, that the time scale for the automatic closing, and the sensitivity to pressure fluctuations must be adjusted to the respective vacuum handling device or vacuum clamping device controlled with the valve.

A vacuum valve is also described in DE 102 16 220 A1, wherein the valve body is formed by a disk-like element.

SUMMARY OF THE INVENTION

The invention addresses the object of preventing an undesired leakage between the vacuum supply side and the suction side when the suction side is unoccupied, and to prevent thereby an undesired sensitivity to flow impacts, as well as to enable an adjustment to the properties of the activated vacuum handling device or vacuum clamping device.

This object is achieved by means of a valve, as well as by a vacuum gripping device. Automatically closing valves, which do not make use of a flow impulse, but rather, exploit a static pressure difference that occurs in an unoccupied state of the suction side for the closing thereof are the basis for this. The valve has a valve housing, which has a vacuum supply side with a suction connection for connecting to a vacuum supply device, as well as a suction side for connecting to a vacuum handling device or vacuum clamping device that is to be controlled. The suction side and the vacuum supply side are provided on opposite sides of the housing, or, respectively, the valve housing extends substantially between the suction side and the vacuum supply side. A flexible dividing wall is provided in the valve housing, e.g. a membrane, which delimits a control chamber in the valve housing with respect to the suction side. The control chamber communicates with the vacuum supply side and has a flow connection thereto. A valve body is disposed on the flexible dividing wall, which can be moved between an open position and a closed position. The valve body has a sealing section, which bears on a seal seat of the valve when in the closed position, in order to seal the vacuum supply side with respect to suction side. The valve is designed thereby, such that, in relation to a pressure difference between the control chamber and the suction side, in particular a pressure deficit occurring in the control chamber with respect to the suction side, the volume of the control chamber can be decreased through deformation of the flexible dividing wall, wherein the valve body is moved thereby from the open position to the closed position. As a result, when the suction side draws freely in an unoccupied state, the valve body is moved to the closed position due to a static pressure deficit with respect to the suction side that occurs in the control chamber.

The valve body has a suction-side passage for establishing a flow connection from the control chamber to the suction side, such that, when in the open position, the control chamber is connected to the suction side in terms of flow. The seal seat and the sealing section are disposed thereby, such that, when in the closed position, the flow connection from the suction side through the suction side passage is closed in a sealed manner.

The control chamber is connected to the vacuum supply in the open position and in the closed position. This acts on a compression of the control chamber with a deformation of the dividing wall. In the open position of the valve piston, the air drawn in at the suction side flows through the suction side passage into the control chamber, wherein this flow through the suction side passage is limited by the laws of nature. If the suction side is unoccupied (drawing freely), then the comparatively large flow leads to a pressure difference via the flow resistance, and thus to a pressure deficit in the control chamber with respect to the suction side. If the pressure deficit, i.e. the pressure difference between the suction chamber and the suction side, reaches a predetermined, or pre-determinable, value, this leads to a compression of the control chamber and deformation of the dividing wall. The valve piston moves from the open position into its closed position. This results in the sealing section bearing on the seal seat allocated thereto in a sealing manner. Because the control chamber remains connected to the vacuum supply, the valve piston is securely drawn into this closed position.

The valve body is therefore not brought directly into the closed position by the flow impulse when the suction side is unoccupied, but rather, by means of a static pressure difference occurring between the control chamber and the suction side. The sensitivity of the valve according to the invention is influenced by the design of the flexible dividing wall, the tension or flexibility of the flexible dividing wall, and/or by an adjustment of the flow behavior through the suction side passage. The valve can be adjusted to various vacuum handling or vacuum clamping devices, or various vacuum supply devices, respectively.

The suction side has, in particular, at least one suction opening, through which air can be drawn in when the valve is in operation. The suction side and the vacuum supply side can comprise connection elements, e.g. a suction connection element on the suction side, for connecting to a suction connection, e.g. a suction gripper, and a supply connection element on the vacuum supply side, for connecting to a vacuum supply device. It is also conceivable that the valve housing is formed by a section of an encompassing device housing, e.g. a vacuum handling device. In this case, the vacuum supply side is formed, in particular, by a region of the device housing, which communicates with vacuum supply channels that are connected to a vacuum supply device.

In order to define the flow resistance, and thus the vacuum occurring in the control chamber as a function of the suction flow through the suction side, the suction side passage has, in particular, a choke point. The extent of the pressure deficit occurring in the control chamber with respect to the suction side then depends on the flow through the choke point. The response sensitivity of the self-closing valve can thus be adjusted via the choke point. The choke point is preferably designed such that it can be adjusted in order to predefine the flow resistance. For this, a choke actuator may be provided, which can be moved between a choke position, corresponding to a higher flow resistance, and a released position, corresponding to a comparatively lower flow resistance. This can be implemented, for example, by a set screw that can be screwed into a choke channel.

The sealing section and the seal seat allocated thereto are disposed outside the control chamber, such that when the valve body is in the closed position the suction side passage itself is sealed with respect to the suction side. The sealing occurs outside the suction side passage and outside the control chamber, in particular at an external opening of the suction side passage. Thus, in the closed position, the sealed suction side passage itself is likewise evacuated. The design specified here results in the sealing section not being disposed in the control chamber, and thus making it possible to form the control chamber with a smaller volume. As a result, the response time can be shortened, and the response sensitivity of the self-closing valve can be increased.

The valve body can pass through the flexible dividing wall. The valve body is then preferably designed as an aperture section on the side of the dividing wall facing the control chamber. The suction side passage opens into this aperture section. On the other side of the dividing wall, the valve body preferably has a guide section, on which the sealing section is disposed. The guide section extends, in particular, in the manner of a piston or pin, over the dividing wall. The sealing section can then be designed as a projection encompassing the guide section, in particular as a collar-like, coil-like or plate-like projection.

The flexible dividing wall runs, in particular, such that a suction side chamber is formed on the side of the flexible dividing wall facing away from the control chamber, which has a pressure connection to the suction side, in particular opening into a suction opening of the suction side. The flexible dividing wall directly divides, in particular, the suction side chamber from the control chamber. The suction side chamber is thus subjected to the pressure prevailing at the suction side. Thus, on one hand, the vacuum occurring in the control chamber acts on the flexible dividing wall, and on the other hand, the pressure at the suction side acts thereon. The deformation of the dividing wall occurs as a function of the pressure difference occurring between the two chambers.

These designs enable an advantageous construction of the seal seat and the valve body. In particular, the valve housing has a suction side internal wall, which delimits the suction side chamber having a flow connection to the suction side. The guide section extends in this suction side chamber along a longitudinal direction, wherein the suction side internal wall has a radial step, which forms the seal seat for the sealing section. The cross-section of the suction side chamber increases at the step with respect to the longitudinal direction in jumps. The guide section is formed in the suction side chamber, preferably with sufficient play with respect to the suction side internal wall, such that, when in the open position, a flow is possible from the suction side through the suction side passage into the control chamber.

The suction side passage runs in the manner of a channel, for example, in the guide section. It extends, for example, along a longitudinal extension direction of the guide section, away from the dividing wall, and opens into a connecting opening in the suction side chamber disposed between the dividing wall and the sealing section. The connecting opening is preferably disposed on a radial bordering wall of the guide section. The aforementioned choke point can, for example, be designed thereby as a radial through hole or radial through channel from the longitudinal channel of the suction side passage, running along the longitudinal extension of the guide section.

An advantageous assembly is enabled in that the flexible dividing wall is secured along an encompassing edge in the valve housing. The dividing wall serves, in particular, as a supporting membrane for the valve body. This is preferably spaced apart from the encompassing edge in this flexible dividing wall, in particular, it is supported centrally in the flexible dividing wall.

A tension force for the valve body in its open position, against a movement to the closed position, can be defined by the tension and/or elasticity of the dividing wall. As a result, the response sensitivity of the self-closing valve can be adjusted, i.e., to the respective pressure difference between the control chamber and the suction side, at which point the valve body assumes its closed position. It is also conceivable that an adjustment device be provided for defining the tension of the flexible dividing wall. A spring element can also be provided, which is supported, on one hand, against the valve housing, and on the other hand, against the valve body, tensioning the valve body in its open position.

The valve can be installed in a simple manner, when the valve housing is designed as a multi-piece component, having an upper part and a lower part connected thereto, wherein the flexible dividing wall is clamped between the upper part and lower part, such that the control chamber extends in the upper part and is delimited by the flexible dividing wall at the connection to the lower part.

In order to achieve the object defined above, a suction gripper device is also disclosed, which has a suction body with a suction chamber that is to be brought to bear on a workpiece that is to be gripped therewith, wherein this suction chamber is connected to the suction side of a valve of the type described above. The suction body is preferably connected to the flexible dividing wall and/or the valve body, such that when the valve body moves from the open position to the closed position, the suction body is moved from a suction position, into which it has been pushed, into a retracted passive position. To this end, the suction body can be connected to the valve body.

BRIEF DESCRIPTION OF THE DRAWINGS

Other advantages of the invention will be readily appreciated as the same becomes better understood by reference to the following detailed description when considered in connection with the accompanying drawings, wherein:

FIG. 1 is a sectional view of a suction gripper device 10.

DETAILED DESCRIPTION OF THE PREFERRED EMBODIMENTS

The suction gripper device 10 has a device housing 12, on which a suction body 14 is disposed such that it can be brought to bear on a workpiece that is to be gripped. As a matter of course, the suction gripper device 10 can also contain numerous suction bodies 14 disposed on the device housing 12.

The suction body 14 borders on a suction chamber 16 for suctioning a workpiece, which chamber is open in a suction direction. A valve 20 according to the invention, for controlling the vacuum supply of the suction chamber 16, is allocated to the suction body 14.

The valve 20 has a valve housing 22, which is formed in the depicted example by the part of the device housing 12 that can be recognized in FIG. 1. The valve housing 22 has a multi-part construction, having an upper part 24, and a lower part 26 connected thereto.

The upper part 24 of the valve housing 22 has a vacuum supply side 28, which communicates with a, not shown, vacuum supply device, such that the vacuum supply side 28 can be evacuated. The lower part 26 has a suction side 30 on the opposite side, which is connected to the suction chamber 16 of the suction body 14. To this end, the valve housing 22 has a connecting element 32 on the suction side 30, to which the suction body 14 can be connected. By way of example, the connecting element 32 is designed as a connecting nozzle, onto which a nipple of the suction body 14 can be placed.

A flexible dividing wall 34, designed as a flexible membrane, is clamped in the valve housing 22 between the upper part 24 and the lower part 26. This delimits a control chamber 36 in the upper part 24 of the valve housing 22, which is connected to the vacuum supply side 28.

A valve body 38 is disposed on the flexible dividing wall 34. This valve body passes through the flexible dividing wall 34 and has an aperture section 40 facing the control chamber 36, as well as a guide section 42 extending in the manner of a piston on the other side of the flexible dividing wall 34. The guide section 42 extends thereby along a longitudinal direction 43 away from the flexible dividing wall 34. The valve body 38 has, on its side facing away from the flexible dividing wall 34, a sealing section 44 radially encompassing the guide section 42 on the exterior of the control chamber 36.

On the side facing away from the control chamber 36, the flexible dividing wall in the valve housing 22 (here: in the lower part 26) delimits a suction side chamber 46, which communicates with the suction side 30 and opens out into this suction side. The suction side chamber 46 is delimited by a suction side internal wall 48, lateral to the longitudinal direction 43. The guide section 42 is fit into the suction side chamber 46 delimited in this manner, such that it can be moved axially with play in relation to the suction side internal wall 48.

In the further course of the dividing wall 34, the suction side internal wall 48 has a step 50, at which the cross-section of the suction side internal chamber 46 increases in jumps, perpendicular to the longitudinal direction 43. For this, the step 50 is formed, for example, by a stop wall 52, bent radially outward. The sealing section 44 can bear thereon, as shall be explained in greater detail below, in order to form a seal.

A suction side passage 54 passes through the valve body 38, through which (at least when the valve body 38 is in the open position, as shall be explained in greater detail below) the control chamber 36 has a flow connection to the suction side chamber 46 and thus to the suction side 30. Starting from the aperture section 40, the suction side passage 54 first extends as an axial longitudinal channel 56 in the guide section 42. In the region of the guide section 42 facing away from the flexible dividing wall 46, the longitudinal channel 56 is closed in the axial direction (along the longitudinal direction 43). A radial bore 58 passes through the guide section 42, starting from the longitudinal channel 56, outward, and opens in a connecting opening 60 of the suction side chamber 46. A choke point 62 is defined by the radial bore 58. The choke point 62 defines a flow resistance for a flow from the suction side chamber 46 through the suction side passage 54 into the control chamber 36.

The stop wall 52 and the step 50 of the suction side internal wall 48 form, in an exemplary manner, a seal seat 64 for the sealing section 55. When the sealing section 55 bears on this seal seat 64, then the suction side passage 54 is sealed against the suction side 30.

In the depicted example, the sealing section 44 encompasses the guide section 42 in the region of the suction side chamber 46 following the step 50, in which this suction side chamber exhibits an enlarged cross-section. The sealing section 44 is designed, e.g., in the manner of a coil and comprises a sealing lip 66 that is open in the manner of a funnel toward the stop wall 52 of the step 50.

The valve body 38 is disposed on the flexible dividing wall 34 such that it can be axially displaced along the longitudinal direction 43 between an open position and a closed position. In the open position, the sealing lip 66 of the sealing section 44 is spaced apart from the allocated seal seat 64 such that air can be suctioned off through the suction side passage 54 from the suction side chamber 46, and thus from the suction side 30. In the closed position, the valve body 38 is deflected along the longitudinal direction 43 toward the control chamber 36, wherein the flexible dividing wall 34 is deformed such that the volume of the control chamber 36 is reduced. With the movement into the closed position, the sealing lip 66 of the sealing section 44 ends up in a sealing bearing on the seal seat 64. As a result, the flow connection between the suction side 30 and the suction side passage 54 is interrupted.

In FIG. 1, the flexible dividing wall 34 is depicted in its normal position. The flexible dividing wall is preferably tensioned such that a deflection of the valve body 38 from its open position to the closed position is only possible when a tensioning force is applied. In order to tension the valve body 38 in its open position, a spring element 68 (in the depicted example, a spiral spring) is provided, which is supported, on one hand, on a wall section of the valve housing 22, and on the other hand, on the valve body 38, such that a movement of the valve body 38 from the open position to the closed position is only possible against the spring force of the spring element. As a result, unintentional movement of the valve body 38 into the closed position is prevented, e.g. when subjected to the force of the weight acting on the valve body, when the valve is operated with the suction side facing upward. The switching states can be stabilized thereby, in particular independently of changes in the position of the valve.

If, in the initially present open state, a suction occurs while the suction side 30 is unoccupied, then a flow is obtained from the suction side 30 through the suction side chamber 46 and through the not yet sealed choke point 62 of the suction side passage 54 in the control chamber 36. The control chamber 36 is evacuated via the vacuum supply side 28. Due to the flow resistance defined by the choke point 62, the flow through the suction side passage 54 is limited, and no appreciable vacuum can be built up in the suction side chamber 46. As a result, a pressure deficit is formed in the control chamber 36 in relation to the suction side chamber 46. This results in the flexible dividing wall 34 being deformed such that the volume of the control chamber 36 is reduced. As a result, the valve body 38 is moved toward the closed position, wherein the sealing section 44 ends up bearing against the seal seat 64. As soon as this is the case, a further flowing from the suction side 30 through the suction side passage 54 in the control chamber 36 is prevented. As a result, the suction side passage 54 and the sub-section of the suction side chamber 46, sealed off from the suction side 30 by the sealing section 44, are evacuated, and thus the valve body 38 is fixedly suctioned into its closed position. When drawing freely through an unoccupied suction side 30, the valve 20 thus switches automatically to its closed position.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A valve for a vacuum handling or vacuum clamping device, said valve comprising
a valve housing, which has a vacuum supply side for connecting to a vacuum supply device, and a suction side,
a flexible dividing wall, which delimits a control chamber in the valve housing, which control chamber communicates with the vacuum supply side,
a valve body disposed on the flexible dividing wall, which can be moved between an open position and a closed position, wherein the valve body has a sealing section, which bears against a seal seat when in the closed position, in order to seal the vacuum supply side against the suction side, and wherein a volume of the control chamber can be reduced through deformation of the flexible dividing wall, depending on a vacuum occurring in the control chamber, and the valve body is moved thereby from the open position to the closed position, such that when suction occurs in an unoccupied state, the suction side of the valve body can be moved to the closed position due to a vacuum occurring in the control chamber, wherein the valve body has a suction side passage for a flow connection of the control chamber to the suction side, and wherein the sealing section and the seal seat are disposed outside the control chamber such that, when in the closed position, the suction side passage is sealed against the suction side and the flow connection from the suction side through the suction side passage is closed in a sealed manner, wherein the suction side passage has a choke point, which defines a flow resistance for a suction flow from the suction side in the control chamber such that, when air is suctioned in, a vacuum is formed between the suction side and the control chamber.

2. The valve as set forth in claim 1, wherein the valve body passes through the flexible dividing wall, wherein the valve body has an outlet section on a first side of the flexible dividing wall facing the control chamber, and a guide section on a second side of the flexible dividing wall, wherein the suction side passage opens into the outlet section, and the sealing section is disposed on the guide section.

3. The valve as set forth in claim 2, wherein the valve housing, with a suction side internal wall, delimits a suction side chamber that has a flow connection to the suction side, in which the guide section extends along a longitudinal direction, wherein the suction side internal wall has a step, which forms the seal seat for the sealing section.

4. The valve as set forth in claim 2, wherein the suction side passage runs in the manner of a channel, along a longitudinal extension direction of the guide section, away from the flexible dividing wall, in the guide section, and opens into a connecting opening disposed between the flexible dividing wall and the sealing section.

5. The valve as set forth in claim 1, wherein the guide section is designed in the manner of a piston protruding over the flexible dividing wall, and the sealing section is designed as a projection encompassing the guide section.

6. The valve as set forth in claim 1, wherein the flexible dividing wall is secured in the valve housing along an encompassing edge.

7. The valve as set forth in claim 1, wherein the flexible dividing wall is tensioned such that the valve body is pretensioned in the open position against a movement into the closed position.

8. The valve as set forth in claim 1, wherein the valve housing has a multi-part design, having an upper part, and a lower part connected thereto, wherein the flexible dividing wall is clamped between the upper part and the lower part such that the control chamber extends in the upper part and is delimited by the flexible dividing wall at a connection to the lower part.

9. A vacuum gripping device having a suction body, which has a suction chamber that is to be placed on a workpiece that is to be picked up, and having a valve including a valve housing, which has a vacuum supply side for connecting to a vacuum supply device, and a suction side, a flexible dividing wall, which delimits a control chamber in the valve housing, which control chamber communicates with the vacuum supply side, a valve body disposed on the flexible dividing wall, which can be moved between an open position and a closed position, wherein the valve body has a sealing section, which bears against a seal seat when in the closed position, in order to seal the vacuum supply side against the suction side, and wherein the volume of the control chamber can be reduced through deformation of the flexible dividing wall, depending on a vacuum occurring in the control chamber, and the valve body is moved thereby from the open position to the closed position, such that when suction occurs in an unoccupied state, the suction side of the valve body can be moved to the closed position due to a vacuum occurring in the control chamber, wherein the valve body has a suction side passage for a flow connection of the control chamber to the suction side, and wherein the sealing section and the seal seat are disposed outside the control chamber such that, when in the closed position, the suction side passage is sealed against the suction side and the flow connection from the suction side through the suction side passage is closed in a sealed manner, wherein the suction side passage has a choke point, which defines a flow resistance for the suction flow from the suction side in the control chamber such that, when air is suctioned in, a vacuum is formed between the suction side and the control chamber, wherein the suction chamber is connected to the suction side of the valve.

10. The vacuum gripping device as set forth in claim 9, wherein the suction body is connected to the valve body such that when the valve body is moved from the open position to the closed position, the suction body is moved from an advanced suction position to a retracted passive position.

\* \* \* \* \*